United States Patent [19]
Hilgendorf et al.

[11] Patent Number: 5,930,491
[45] Date of Patent: Jul. 27, 1999

[54] IDENTIFICATION OF RELATED INSTRUCTIONS RESULTING FROM EXTERNAL TO INTERNAL TRANSLATION BY USE OF COMMON ID FIELD FOR EACH GROUP

[75] Inventors: Rolf Hilgendorf, Böblingen; Wolfram Sauer, Nufringen; Hartmut Schwermer, Stuttgart, all of Germany

[73] Assignee: International Business Machines Corporation, Armonk, N.Y.

[21] Appl. No.: 08/879,451

[22] Filed: Jun. 20, 1997

[30] Foreign Application Priority Data

Jun. 18, 1997 [EP] European Pat. Off. ............. 97109937

[51] Int. Cl.⁶ ..................................................... G06F 9/30
[52] U.S. Cl. ...................................... 395/385; 395/800.41
[58] Field of Search .................................... 395/385, 382, 395/388, 391, 567, 800.23, 800.41, 800.42, 800.43

[56] References Cited

U.S. PATENT DOCUMENTS

| | | | |
|---|---|---|---|
| 5,115,500 | 5/1992 | Larsen | 395/385 |
| 5,430,862 | 7/1995 | Smith et al. | 395/800.41 |
| 5,542,059 | 7/1996 | Blomgren | 395/800.41 |
| 5,546,552 | 8/1996 | Coon et al. | 395/385 |
| 5,568,646 | 10/1996 | Jaggar | 395/800.41 |
| 5,619,666 | 4/1997 | Coon et al. | 395/391 |
| 5,627,982 | 5/1997 | Hirata et al. | 395/382 |
| 5,630,083 | 5/1997 | Carbine et al. | 395/388 |
| 5,638,525 | 6/1997 | Hammond et al. | 395/385 |
| 5,664,136 | 9/1997 | Witt et al. | 395/388 |
| 5,758,115 | 5/1998 | Nevill | 395/385 |
| 5,774,686 | 6/1998 | Hammond et al. | 395/385 |
| 5,781,753 | 7/1998 | McFarland et al. | 395/391 |
| 5,790,825 | 8/1998 | Traut | 395/385 |
| 5,796,973 | 8/1998 | Witt et al. | 395/388 |
| 5,826,089 | 10/1998 | Ireton | 395/385 |

*Primary Examiner*—Richard L. Ellis
*Attorney, Agent, or Firm*—Marc A. Ehrlich

[57] ABSTRACT

A method for addressing internal instructions in an out-of-order processor is proposed, which allows for an efficient register renaming even in case internal instructions are issued to a multitude of window buffers. In this case, it is not clear how internal instructions that stem from one external instruction can be indicated as being "related". In the method proposed, a common instruction identifier is assigned to each of the internal instructions of a group of internal instructions representing an external instruction. Furtheron, an offset identifier is assigned to each of said internal instructions in order to be able to unambiguously identify each of said internal instructions. These two identifiers are used as a tag, in order to be able to resolve data dependencies. By use of the invention, exception handling, recovery of mispredicted branches, and committing related instructions corresponding to one external instruction is simplified.

20 Claims, 5 Drawing Sheets

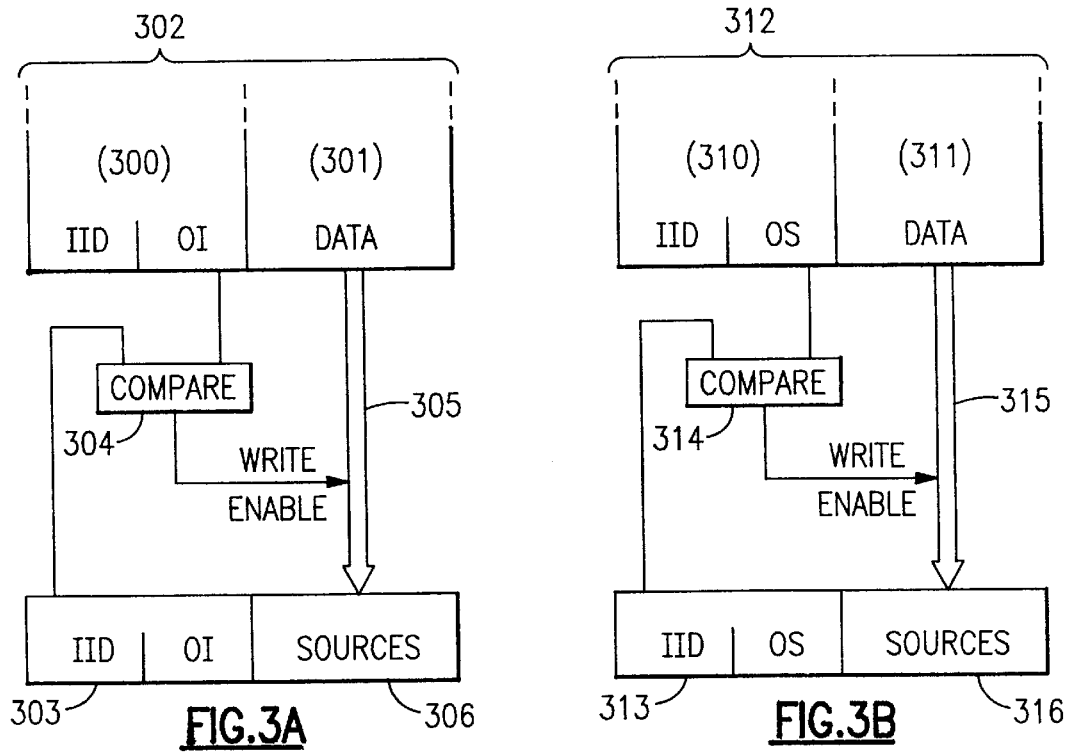

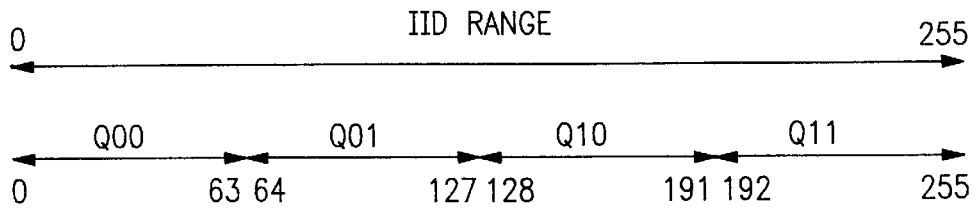

FIG.6

1. THE TWO HIGH ORDER BITS OF THE IID1. IF "<s" DENOTES THE RELATION "IS EARLIER IN THE EXTERNAL SEQUENCE", THE FOLLOWING HOLDS:
   00 <s 01, 01 <s 10, 10 <s 11, 11 <s 00.

TRUTH TABLE (701):

|      | 00 | 01 | 10 | 11 | IID2 |
|------|----|----|----|----|------|
| 00   | 0  | 1  | X  | 0  |      |
| 01   | 0  | 0  | 1  | X  |      |
| 10   | X  | 0  | 0  | 1  |      |
| 11   | 1  | X  | 0  | 0  |      |

IID1

1 MEANS IID1 <s IID2
0 MEANS NOT (IID1 <s IID2)
X CANNOT OCCUR FOR ACTIVE IIDs

2. IF THE HIGH ORDER BIT ARE EQUAL, THE USUAL LOGICAL COMPARISON OF THE LOW ORDER BITS (ALL BITS EXCEPT FOR THE TWO HIGH BITS) OF THE IIDs DECIDES WHICH IID IS EARLIER IN THE EXTERNAL SEQUENCE.

FIG.7

IDENTIFICATION OF RELATED INSTRUCTIONS RESULTING FROM EXTERNAL TO INTERNAL TRANSLATION BY USE OF COMMON ID FIELD FOR EACH GROUP

FIELD OF THE INVENTION

The invention relates to computer systems that process instructions out of their sequential order, and especially to a tag mechanism that is well-suited when more than one window buffer is employed.

BACKGROUND OF THE INVENTION

In computer systems that process instructions out of their sequential order, data dependencies between instructions that produce target data, and instructions that use said target data as source data, have to be taken care of carefully. This is usually done by mechanisms known as "register renaming" and "register allocation".

A number of external instructions that have been fetched from the instruction stream are decoded to internal instructions which are forwarded to a reservation station where they are analyzed for data dependencies. In the reservation station (or the instruction window buffer), the instructions wait until all their source operands are available. As soon as this is the case, an instruction can be forwarded from the reservation station to one of the processor's functional units. Results produced by said functional units are rewritten to the instruction window buffers.

R. M. Tomasulo has been the first to present an algorithm for dependency resolution concerning instructions that are to be processed out-of-order. A summary of his ideas is to be found in IBM J. Res. Develop. pages 25–33, January 1967, "An efficient algorithm for exploiting multiple arithmetic units", to T. M. Tomasulo. This article is incorporated herein by reference.

The algorithm operates as follows: An instruction whose operands are not available when it enters the decode stage is forwarded to a reservation station. It waits in said reservation station until its data dependencies have been resolved and its operands are available. Once at a reservation station an instruction can resolve its dependencies by monitoring the common data bus (the result bus). When all the operands for an instruction are available, it is dispatched to the functional unit for execution. Each source register is assigned a tag which identifies the result that will be written into the register. Since any register in the register file can be a source register, each register must be assigned a tag. All instructions issued later and using said register as a source, will receive the same tag, too.

Commonly the entry number of the reservation station entry is used as the tag. The entry number of the reservation station can also be used for renaming: Acquiring a tag for the result at the same time defines an entry in the reservation station. Thus the entry number in the reservation station becomes the tag. This holds if a reorder buffer, which is used in order to allow for precise interrupts, is incorporated into the above, too. A solution with a combined reservation station and renaming approach can be found in the article "Instruction issue logic for high-performance interruptable, multiple functional unit, pipelined computers" by G. S. Sohi, IEEE, Transactions on Computers, vol. 39, number 3, March 1990, which is also incorporated herein by reference.

However using just the entry number as a tag becomes problematic when speculative execution of instructions due to prediction of conditional branches is attempted. A mispredicted branch causes several entries of the combined reservation station and reorder buffer, called instruction window buffer, to be cleared. These are all entries which are younger than the mispredicted branch. After clearing the entries they will be reused for loading the instructions from the correct path. The problem arises if an entry is reused and the previous, cleared instruction was already sent to an execution unit and now wants to write back its result. Writing back and especially picking up said result by a depending instruction must be prohibited. The simply entry number is not enough. Some path ID has to be added.

Instead of issuing instructions to one common reservation station, it might be advantageous to use separate window buffers, to which internal instructions are issued according to their type. There do exist solutions where separate window buffers for register operations (operations that modify registers) and storage operations (operations that write to or read from storage) are used. Typically, an external instruction from the external instruction stream is decoded into a number of internal instructions, which are distributed to the different window buffers according to their type. This implies that there is a lot of data exchange taking place between the internal instructions in the different window buffers. Cross-referencing between related instructions in different window buffers occurs rather frequently.

In a solution where window buffer entries are numbered independently a translation unit has to be implemented which translates entry numbers of one window buffer to entry numbers of another window buffer. Usually this is done by adding a constant. This implies additional hardware, and a decrease in performance, because a big amount of extra add operations has to be performed.

But there do exist other disadvantages when using separate, independent tag mechanisms.

In case of an exception, for example in case of a translation exception, instruction execution has to go back to the point where the exception occurred. When several separate window buffers are used, it is necessary to go back to the point where the exception occurred in each of these buffers. This implies that entry numbers have to be translated from one system to the other.

A similar problem arises when instructions have to be purged because a branch has been mispredicted. Also in this case, instruction execution has to go back to the purge-point.

When committing instructions, the result values produced by said instructions are recorded as architected register values. When using separate window buffers, it is necessary to take care of the relative order of internal instructions distributed among different window buffers when committing said instructions. Therefore, also here, a translation between the different tag systems is necessary.

OBJECT OF THE INVENTION

It is an object of the invention to provide a tag mechanism which accomplishes the task of renaming for dependency resolution, which is well-suited for the use of multiple window buffers.

SUMMARY OF THE INVENTION

The object of the invention is solved by a method for addressing internal instructions in an out-of-order processor according to claim 1, and by an out-of-order processor according to claim 11.

To each of the internal instructions of a group of internal instructions representing an external instruction from the external instruction stream, one common instruction identifier is assigned. This allows to indicate that said internal instructions of said group of internal instructions are related. For each part of an external instruction, the same identification number is employed, no matter to which window buffer said part is issued.

Thus, the data exchange between related instructions that have been issued to different window buffers, the so-called cross-referencing, is simplified a lot. As most of the data exchange between different window buffers is taking place between related internal instructions, the increase in performance is rather high. The tag of the related instruction in a different window buffer can be determined without any translation unit, and without adding and subtracting of constants. Data that has to be written to a different window buffer just has to address the corresponding internal instruction having the same instruction identifier.

In case an exception occurs, for example a translation exception, it is very easy to determine the common point in the instruction stream to which instruction execution has to go back to, because said point can be indicated by one common instruction identifier. Also here, time consuming translations between different tag systems can be avoided.

In case of mispredicted branches, instructions that have been executed after a so-called purge-point have to be erased. This task is simplified a lot by being able to access this purge-point in all the separate window buffers in parallel, because said purge-point can be characterized by one common identifier. Thus, the recovery after a mispredicted branch becomes a lot easier.

The same argumentation holds for the commit process. When committing instructions contained in different window buffers, the relative order of said instruction has to be taken care of (instructions have to be committed in sequential order). With the concept of a common instruction identifier a solution to this possible hazard can easily be found; an internal instruction in either window buffer must not be committed before all internal instructions with preceding instruction identifiers have been committed.

When assigning one common identifier to all the internal instructions that have originated from one external instruction, it is very easy to determine the status of said external instruction, because the status of the corresponding internal instructions can be easily accessed via their common identifier, though these instructions are contained in different window buffers.

In a further embodiment of the invention, an offset identifier is assigned to each of said internal instructions of said group of internal instructions representing an external instruction, in order to unambiguously identify each of said internal instruction.

With said additional offset information, it is possible to provide a unique tag to each internal instruction. One is therefore able to determine whether target data having a certain tag is to be copied to a certain source data field in one of the window buffers.

In another embodiment of the invention, said external instructions are of the CISC-type, and said internal instructions are of the RISC-type. At the decode stage, each of the external CISC-instructions is transformed into a number of simple RISC-instructions, which are much better suited for out-of-order processing. Use of the invention is especially advantageous in this situation, because it allows to easily identify all the RISC-instructions that have emerged from a certain CISC-instruction, though said RISC-instructions have been dissociated among a multitude of window buffers.

In another embodiment of the invention, assigning of instruction identifiers to internal instructions is stopped as soon as more than a predefined fraction of the range of possible instruction identifiers has been assigned to internal instructions.

Several cycles after an internal instruction has been dispatched to any of the functional units, its result data appears on the result bus, in order to be forwarded to different source operand fields that need said result data. The case might occur that, during the time the instruction has been processed at the functional unit, it has become necessary to erase a set of instructions in the window buffer, including the instruction just processed,. In this case, a hazard might occur, when the prior instruction identifier has been reassigned to a different instruction. It would be incorrect to forward result data of the old instruction to the new instruction having the same instruction identifier. By the method proposed, this hazard is avoided.

BRIEF DESCRIPTION OF THE DRAWINGS

FIG. 3a and 3b shows how data that appears on the result bus is copied into the respective positions of either the instruction window buffer or the storage window buffer.

FIG. 4 shows a multitude of RISC-like operations in both the IWB and the SWB, which together constitute the instruction "OR immediate".

FIG. 6 shows a way of segmenting the range of instruction identifiers which can be assigned to an instruction.

FIG. 7 shows how the instruction identifiers can be used to determine the relative sequential position of two instructions executed out-of-order.

DETAILED DESCRIPTION OF THE INVENTION

Figure 1:
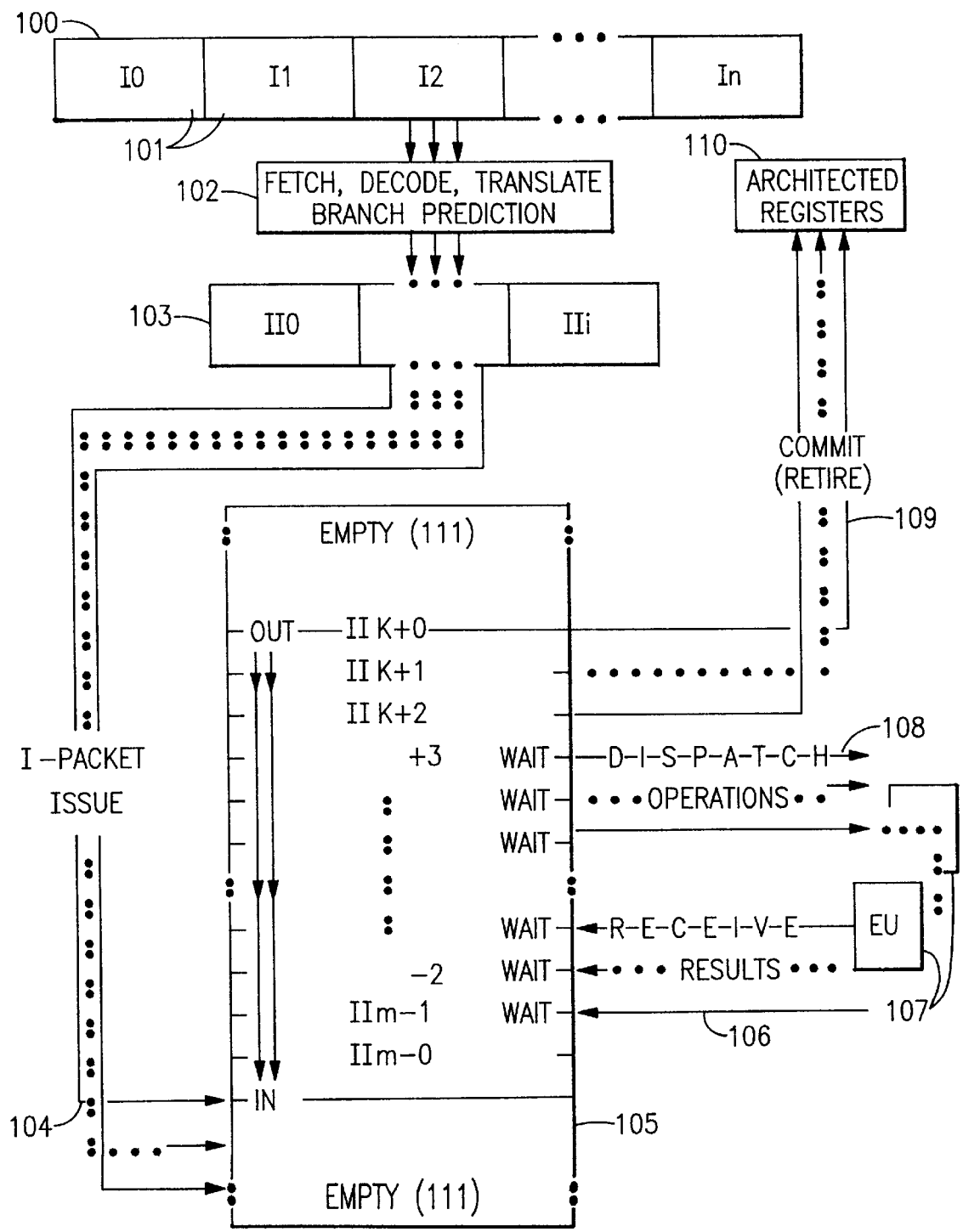
FIG. 1 shows the structure of a computer system which processes instructions out of their sequential order.

FIG. 1 shows the basic set-up of a superscalar computer system, which processes instructions out of their sequential order. This instruction processing concept is also referred to as data flow computing.

As in conventional, sequential processing techniques, one starts with a stream of ordered instructions (100). These instructions (101) can either be of the RISC (Reduced Instruction Set Computing) type or of the CISC (Complex Instruction Set Computing) type. The S/390 instructions which IBM mainframes can process are of the CISC-type and also include instructions written in microcode.

Implementing an out-of-order processing unit based on CISC-type instructions, which require long cycle times and complex pipelines, leads to a number of difficulties. The internal execution units, which interpret the internal operation code semantics, are simpler and more efficient when they only have to deal with simple RISC-type instructions. Furtheron, the internal processor instruction interpretation mechanism is more efficient when it has to deal only with standardized and uniform instruction formats. For these reasons it is advantageous to use short, standardized operations of the RISC-type for superscalar processing.

In case the instructions (101) of the external instruction stream (100) are already of the RISC-type, they only have to be fetched and forwarded (104) to the issue process. Branches that are part of the instruction stream are predicted at this stage.

In case the external instructions are of the CISC-type, they have to be decoded and translated into a standardized internal RISC-type instruction format after they are fetched (102). The translation of one external instruction can result in several internal instructions. The translated instructions, also called instruction packet (103), are then handed over to the issue process. The instruction issue process puts the above instruction packet into an instruction window (105), which is an execution buffer. The instruction window is implemented as a circular buffer and is controlled by two pointers, an IN-pointer, depicting the first entry to be used by the issue process, and an OUT-pointer indicating the first entry to be used by the commit-process. Each window buffer entry contains one instruction and has room for the instruction image, comprising the registers being used by this instruction, and also for the data of these registers. This means that each instruction in the window buffer carries all data associated with it, the source data required as input for the instruction and also the target data produced as result of the execution. It is obvious, that at a specific point in time, the window buffer may contain several instances of a specific register.

At the time an instruction is put into the window buffer it enters the state "Operand-Waiting". All target registers of the instructions located in the window buffer above the new instruction are searched for data needed by the new instruction as source data. The search starts from the instruction directly preceding the new instruction and continues to the earlier ones in sequence. Thus the latest instance of the needed register is found. If this register already contains valid data, the data are copied into the source register field of the new instructions. Else the relationship of the registers, the target register of an earlier instruction and the source register of the new instruction, is marked, and when the result is ready, not only the target register will receive the data from the execution units (107), but also all source registers which need this result (106).

Given that all source data for an instruction has arrived at its window buffer entry, execution of this instruction can be done independently of all the other instructions in the window buffer and out of sequence. The instruction enters the "Dispatch-Waiting" state, and presents itself, together with its source data, to the instruction execution units (107) for execution. This is called dispatch process (108) and is ideally implemented with fully associative logic. After execution is done, result data is written back as target data to the originating window buffer entry, and to the source data fields of all window buffer entries which wait for these data. The process just described is called a data-flow process, in the sense that data flows to the instructions which require them as sources and that the arrival of these data triggers the instructions' execution dispatch.

After result data have been written back to the window buffer entry of an instruction, the instruction enters the "Commit-Waiting" state. The commit-process (109) scans through the window buffer entries in sequence starting with the oldest one and commits the instructions. This means that the result data of each processed window buffer entry ("Commit-Waiting") is written back to the architected processor resources, for example to the architected register file or to storage. Next, the window buffer entry is freed by moving the OUT-Pointer. The commit-process ends when it hits a not yet processed window buffer entry.

Because the commit-process is the only process which alters the architected processor resources, and because it does this in instruction issue sequence, the architected state of the machine advances in sequential order, although the instructions were executed out-of-order.

Figure 2:
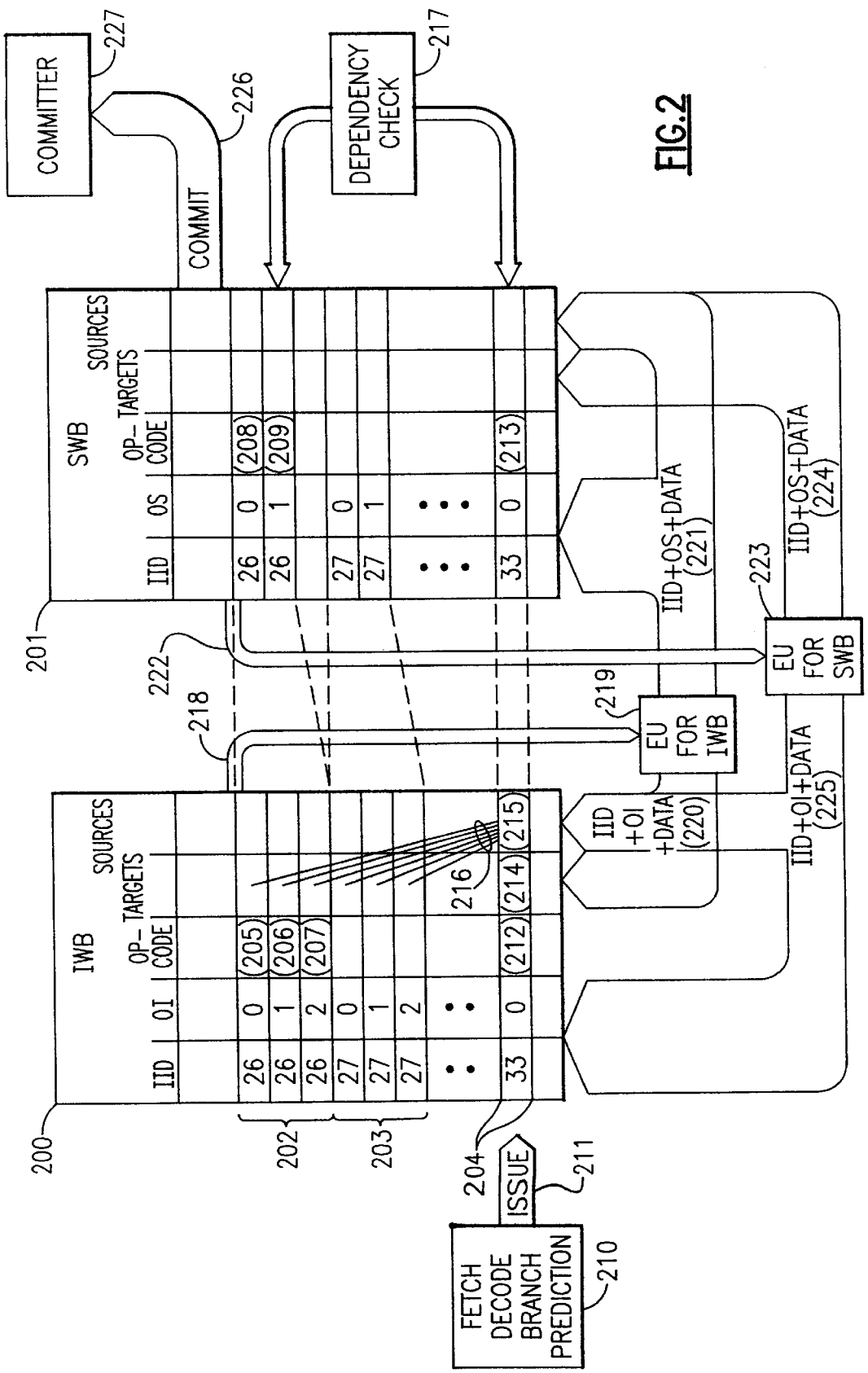
FIG. 2 shows a more detailed structure of an out-of-order processor, with the instruction window of FIG. 1 being split into an instruction window buffer (IWB) and a storage window buffer (SWB).

In FIG. 2 an implementation of an out-of-order processing system is shown, where the window buffer is broken up in an instruction window buffer (IWB, 200) and a storage window buffer (SWB, 201). Internal instructions which access memory, for example load and store operations, are issued to the storage window buffer (201). These instructions modify memory contents, but they also have an impact on register values. Internal instructions which do not modify memory, but which access processor registers, are issued to the instruction window buffer. The distinction between these two types of internal instructions is made at the "Fetch, Decode and Branch Prediction stage" (210), where external instructions (which can be of the CISC-type) are fetched and decoded to a number of internal RISC-operations. According to whether the internal instruction does access memory or not, it is either issued (211) to the storage window buffer (201) or to the instruction window buffer (200). Thus, each external instruction, for example the external instruction 202, is broken up into a number of internal IWB-instructions (205, 206, 207) and into a number of internal SWB-instructions (208, 209). The number of internal instructions associated with an external instruction depends on the type of the external instruction. For every instruction in the storage window buffer, there exists an anchor in the IWB, for example an address calculation instruction.

Each internal instruction in the IWB is defined by its OP-code (212). In the source field (215) of each instruction window buffer entry, the processor registers that contain the instruction's operands are identified. As soon as all the source data is available, the internal instruction is ready for dispatch. As a result of the instruction's execution, result data is written to certain target registers. These target registers are specified in the target field (214) of each instruction window buffer entry.

Each storage window buffer entry also contains an OP-code (213) and source and target data fields. The source and target data fields specify memory addresses which are to be accessed by the SWB instruction.

As soon as instructions are processed out-of-order, care has to be taken of data dependencies. Let's consider the case that both the internal IWB instructions 205 and 206 write their result to one certain target register, and that the internal instruction 207 uses the content of said register as source data. Therefore, instruction 207 can only be dispatched as soon as instruction 206 has been completed. Because of data dependencies, it is not possible to execute instructions 206 and 207 out of their regular order. From this example another feature of out-of-order processing systems becomes obvious: As both internal instructions 205 and 206 write to the same logical processor register, two physical instances of said logical register have to exist. Identifying a number of physical registers with one logical register, in order to account for several instances of a logical register, is generally referred to as "register renaming".

A method for dependency resolution has first been given by Tomasulo. Whenever a new internal instruction is issued to the instruction window buffer, tags are assigned to its target registers. Next, the target registers of earlier instructions are searched for a match with the source registers of the instruction that has just been issued (216). Whenever a match occurs, the tags that previously have been attached to the target registers of earlier instructions are copied to the source register field (215) of the new instruction. Thus tags are attached to target registers, and all instructions issued later and using that register as a source will receive the same tag, too.

The tags are used to identify result data that appears on the result bus. This result data is not only written to the target register of the instruction that has just been executed, but also to all source register data fields of the following instructions said use that result as source data.

In the storage window buffer, there also exist data dependencies due to memory accesses. These data dependencies can only be resolved after address translation has been performed, because the absolute addresses have to be known in order to determine whether there exists a data dependency or not. The dependency check unit (217) is responsible for identifying said storage data dependencies.

The window buffers depicted in FIG. 2 use a combined reservation station and renaming approach. An entry number is assigned to each internal instruction which is issued to either the IWB or the SWB. This entry number does not only refer to the position of said instruction in the reservation station, but is also used as a tag for the target registers of the instruction.

In the following a new method for identifying internal instructions in both the IWB and the SWB will be described. One common instruction identifier (IID) is assigned to all the internal instructions that belong to one external instruction, no matter whether they are issued to the IWB or to the SWB. For example, when the external instruction 202 is decoded and mapped into a sequence of internal instructions (205, 206, 207, 208, 209), the instruction ID "26" is assigned to all the internal instructions. Furtheron an offset (OI in the IWB, OS in the SWB) is attached to each internal instruction in order to identify a specific internal instruction within the cluster of internal instructions to which the external instruction has been decoded.

In the example, the internal instructions with IID=26 are distinguished by assigning an OI=0 to instruction 205, an OI=1 to instruction 206 and an OI=2 to instruction 207. Accordingly, OS=0 is assigned to instruction 208 and OS=1 is assigned to instruction 209.

The offset gives the relative position of an internal instruction within the group of internal instructions that corresponds to one external instruction. The assignment of IID and offset takes place when the instructions are issued to the respective buffers; both IID and offset have to be explicitly written to the new window buffer entry. The combination of IID and offset is unique for each internal instruction and therefore it can be used as a tag in order to gate in result data to the respective source and target data fields.

Let us assume that all the source data of an IWB instruction is available, and that said instruction can thus be dispatched (218) to the execution unit of the IWB (219). There, the instruction is executed. Next, the result data produced by the instruction has to be written back via result busses (220, 221) to both the IWB and the SWB. Data that is to be written back to the IWB occurs on the result bus 220 together with the IID and the OI of the instruction that has just been executed in the execution unit 219. The result data is written to the target data field of the instruction window buffer entry with the respective IID and OI, which is the entry that contains the instruction that has just been executed. Furtheron, both IID and OI on the result bus are compared to the IIDs and OIs stored in each source data field of the IWB in order to detect a match. For each instruction buffer entry, there exists a compare unit that performs said comparison. In each case a match occurs the result data is written to the respective source data field. Thus, each instruction that needs the result data appearing on the result data bus as source data is provided with said data.

The mechanism for writing back result data to the SWB via the result bus 221 is different. The IID appearing on the result data bus 221 is the same as that on result data bus 220, but additionally an offset OS is given. Said offset specifies the internal instruction in the SWB which needs said result data as source data. The value of OS is determined dependant on the type of the internal IWB instruction.

A similar structure is encountered when looking at the result data buses belonging to the SWB's execution unit 223. Result bus 224 contains the IID and OS of the instruction that has just been executed, together with its result data. The result data is written back both to the target data field of the actual instruction and to the source data fields of all dependent instructions. Again, there exists a compare unit for each source data field, which detects a match of the IID and OS stored in the respective data field and the IID and OS transmitted via the result bus 224.

In case SWB result data is to be written to the IWB after an SWB instruction has been executed, this is done by result bus 225. Here, besides the IID and the result data an OI is transmitted, which is determined according to the type of the SWB instruction processed. IID and OI are used to address one specific IWB instruction, to which the result data has to be written.

In the IWB, there exists one compare unit per source data field, and the structure of each of said compare units is shown in FIG. 3A. Each source data field of an IWB instruction holds the IID and OI (303) of those instructions that produce data which the instruction considered needs as source data. This IID and OI has been written to an instruction window buffer entry during the data dependency resolution step (216). Whenever the result data (301) appears on the result bus (302), the IID and OI (300) of the instruction that has produced that result data appears there as well. In case a match between the IID and OI stored in a specific source data field (303) and the IID and OI (300) transmitted on the result data bus is detected by a compare unit (304), a "write-enable" signal is activated. This write-enable signal causes the data (301) on the result bus to be written (305) to the respective source data field (306).

It is advantageous to implement the IWB in a way that data slots for holding the actual source and target data are included, instead of just referring to one central temporary register array. The reason for this is that the time needed by an execution unit to access the respective source and target data is considerably reduced when the actual data is carried with the instruction.

FIG. 3B shows one of the SWB compare units. Again each storage window buffer entry contains the IID and OS (313) of the instruction that will deliver the results which are needed as source data. In case this result data (311) appears together with a matching IID and OS (310) on the result bus (312), a compare unit (314) causes the data (311) to be written (315) to the respective source data slot (316).

The way the internal instructions in the IWB and the SWB interact will become more clear when looking at the example shown in FIG. 4. There, the external instruction "OR immediate" has been decoded to a number of internal instructions contained both in the IWB (200) and the SWB (201). When performing an "OR immediate", first, the content of a certain memory location has to be fetched, next, this content has to be ORed with a given value, and then, the result of this OR-operation has to be written back to the same memory location. Therefore, there exist two instructions in the SWB, the instruction for loading the memory content s_lc (IID=33, OS=0) and the instruction for storing the ORed content back to the memory s_st (IID=33, OS=1). All the operations that perform address arithmetics are executed before the memory can be addressed. This is done by agent operations in the IWB. The agent for the s_lc instruction is i_agnld (IID=33, OI=0) in the IWB. The results of the address arithmetics performed by i_agnld are to be written to s_lc in the SWB, therefore, the source of s_lc is IID=33/OI=0.

Vice versa, the content of the memory location addressed by the s_lc is forwarded to its agent i_agnld, therefore, the source of i_agnld is IID=33/OS=0. The i_agnst (IID=33/OI=1) is the IWB agent of the s_st operation (IID=33, OS=1) in the SWB, which therefore uses the address arithmetic results of i_agnst as source data (IID=33/OI=1). The IWB operation i_oi (IID=33,OI=2) performs an OR-operation of the value fetched by i_agnld and a given value. Storing back the result of this OR-operation is initiated by the IWB operation i_st (IID=33/OI=3), which delivers the OR-operation's result value to the store operation s_st (IID=33/OS=1). For this reason, the second source of the s_st operation is IID=33/OI=3. As soon as both the result of the address arithmetics (IID=33/OI=1) and the result of the OR-operation (IID=33/OI=3) are available, the store operation s_st can be executed. As soon as the store operation has been completed, the whole "OR immediate" operation is finished.

The concept of assigning one common IID to all the internal instructions to which one external instruction is decoded, and identifying each internal instruction in the IWB by means of IID and OI, and each internal instruction in the SWB by means of IID and OS, is advantageous in several respects. It is to be compared to a solution where the numbering of IWB and SWB entries is done independently.

As can be seen from the example in FIG. 4, there is a lot of data exchange between the IWB and the SWB, which mostly takes place between instructions that belong to one external instruction. This is called cross-referencing. In case an IWB instruction has to transfer arguments to the SWB, it can address the corresponding SWB entry by providing the IID known from the own entry and a fixed OS. This fixed OS is determined according to the type of the IWB instruction. Vice versa, when an SWB entry transmits arguments to the IWB, it also provides them with the IID and a fixed offset OI, which can be determined without any add-operation. In case of an independent IWB and SWB numbering, an add-operation would be required. Thus, by identifying all internal instructions that correspond to one external instruction by one common IID, no translation between IWB identifiers and SWB identifiers is necessary.

Another advantage of this method of identifying instructions becomes obvious when looking at how exceptions, for example address translation exceptions, are handled. In case a translation exception occurs when the group of internal instructions corresponding to one external instruction is processed, an indication of the occurrence of such an exception has to be recorded somewhere in the window buffers. Usually, exception occurrence is marked in the first IWB entry that belongs to said group of internal instructions. When using two different numbering systems for the IWB and the SWB, the identifier of the first IWB instruction belonging to said group of internal instructions has to be stored somewhere in the SWB in order to be able to access said first IWB entry. With the new method of assigning one instruction identifier to said group of internal instructions and referring to each individual internal instruction by means of this IID and a sub-identifier, the task of indicating the occurrence of an exception becomes very easy: The relevant IWB entry is accessed with the same IID as the instruction that caused the exception, and with the offset OI=0.

When dealing with conditional branches, some kind of branch prediction is usually performed. The outcome of the branch which is not yet known is predicted "taken" or "not taken". Instructions following the conditional branch are processed according to the prediction. As soon as the condition on which the branch depends is evaluated, it turns out whether the prediction has been right or wrong. In case of a wrong prediction, instructions following the conditional branch must not write back their results to any resource.

Furtheron instruction execution has to go back to the so-called "purge-point" where conditional execution started. Here, another advantage of the IID/OI/OS concept emerges. The purge-point only has to be indicated in either the IWB or the SWB, as the corresponding entry in the other buffer can be easily found, because it has the same IID. In prior art solutions where different number systems for the different buffers have been used, it was necessary to indicate separate purge-points for each buffer, or to provide for a translation unit that is able to convert one number system to the other.

During the commit process, the results of internal instructions that have been executed are written back to the respective resources, for example to the registers, or to memory. After this has been done, the internal instruction can be erased. But instructions in the IWB and in the SWB can not be committed independently of each other. The following examples show the interdependence between internal instructions in the IWB and the SWB. Let us consider a conditional branch which is followed by a store to memory. The store operation thus depends on the branch condition. While the branch is contained in the IWB, the store operation is an SWB-instruction. In this case, the store must not be committed before the conditional branch, and thus, there exists an interdependence between the respective commit processes in the IWB and the SWB.

Another example is a "move character" instruction contained in the SWB, which requires an "anchor" in the IWB, an agent which is responsible for address arithmetic.

In case an address translation exception occurs when executing the "move character" instruction, a second attempt to execute the "move character" has to be made. In order to be able to do this, the IWB agent has to perform the address arithmetic again. Therefore, the IWB agent must not be committed before the "move character" in the SWB has been successfully performed, and thus a dependency between the SWB and the IWB instructions exists.

With the IID/OI/OS concept a solution to these possible hazards can be easily found; an internal instruction in either the SWB or the IWB must not be committed before all internal instructions with preceding IIDs have been committed. The IID/OI/OS concept does allow to take care of the relative order of internal instructions even if said internal instructions were issued to different buffers.

As soon as all the internal instructions that correspond to one external instruction, and which thus share the same IID, have been committed, it can be stated that the external instruction has been completed. The IID concept does allow an easy detection of the status of an external instruction, even if this external instruction has been dissociated in a group of internal instructions.

The preceding examples have been discussed with respect to a computer system that contains two window buffers, an IWB and an SWB. One could think of future computer systems which contain a variety of window buffers, to which internal instructions are issued dependent on the type of the internal instruction and dependent on the execution unit required for performing said internal instruction. Even in this case, it might be favourable for a number of reasons to assign a common identifier to all the internal instructions that correspond to one external instruction. The invention is thus in no way limited to a computer system comprising two window buffers.

In the following, a method of generating instruction identifiers (IIDs), which are unique for each window buffer entry, will be discussed. IIDs are n-bit numbers which are generated sequentially, with a wrap-around occurring from all bits being equal to 1 to all bits being equal to 0. To guarantee uniqueness of IID+offset within the window buffers, there must be at least as many IIDs as there are entries in the IWB (assuming the IWB is larger than the SWB). But there should be more IIDs than that in order to achieve good performance and guarantee correct execution in case of IWB and SWB purges.

Figure 5:
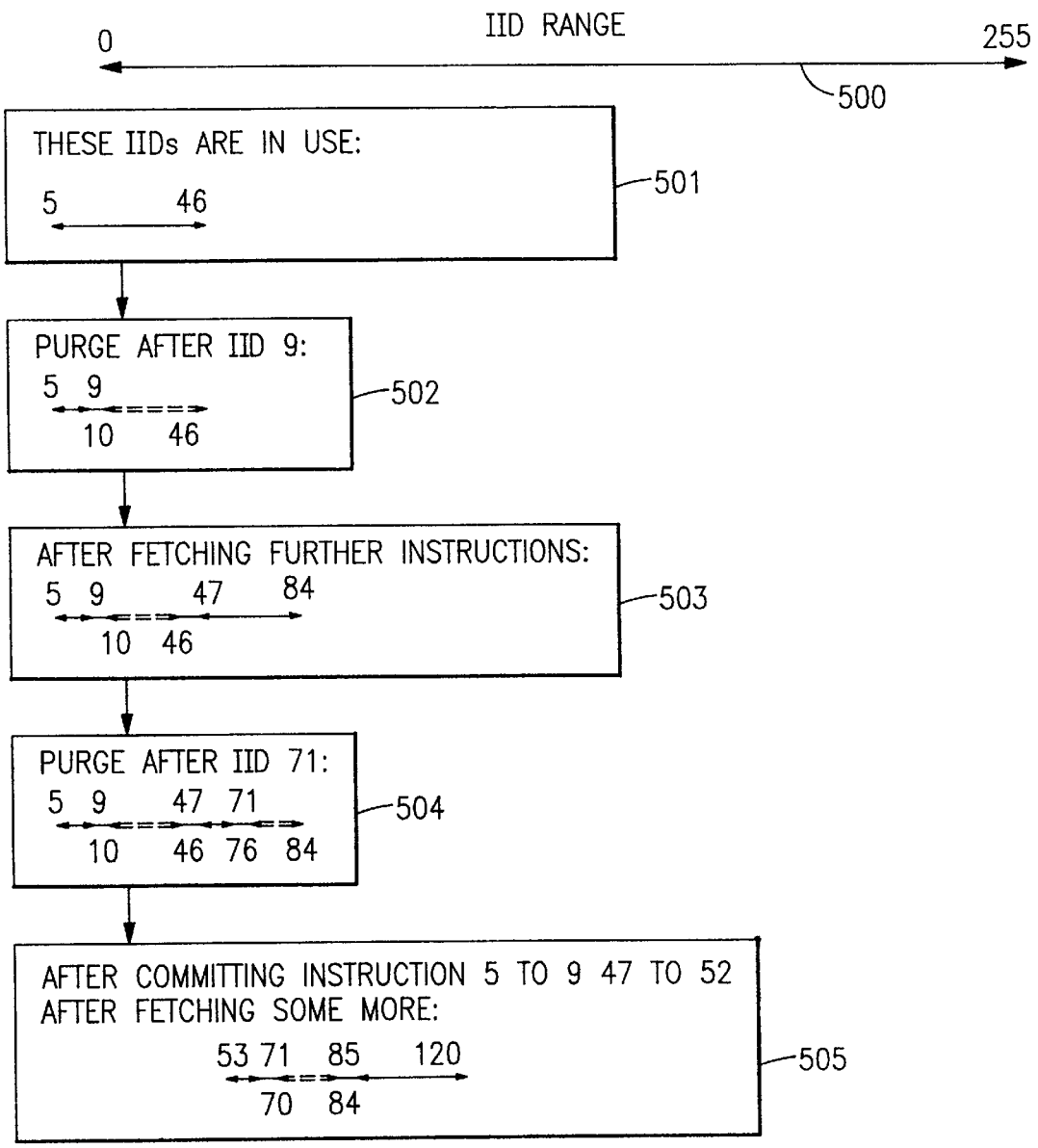
FIG. 5 shows how the range of instruction identifiers in use is modified when instructions are purged, fetched or committed.

In FIG. 5, it is shown in an example how IIDs are generated and assigned. The IIDs used here are 8 bits wide, and therefore, the IID range extends from 0–255 (500). Initially the range from 5–46 is in use (501). If the instruction with IID=9 is identified as a branch which was not predicted correctly, the instructions with IIDs 10–46 have to be purged from the window buffers (502). Now, only the IIDs from 5–9 are used. When further instructions are fetched and issued to the window buffers, new IIDs will be generated. This is show in 503. The next IID which will be generated is 47. This ensures that activities started by instructions that have now been purged will not find a target in the window buffers with matching IID for writing back their results. That means there may be more IIDs in use or blocked—because the associated instructions have been purged—than there are entries in the IWB.

In step 503 of our example of FIG. 5, the IIDs 5–9 and 47–84 are in use. In case the instruction corresponding to IID=70 is a conditional branch that has been mispredicted, the instructions with IIDs between 71 and 84 have to be purged (504). The range of IIDs from 71 to 84 has to be blocked in order to inhibit incorrect write-back of earlier instructions' results. Now, the IIDs from 5 to 9 and from 47 to 70 are in use.

The commit process starts writing back the results of the oldest instructions and frees the corresponding window buffer entries. In 505, a situation is shown where the instructions with IIDs from 5 to 9 and from 47 to 52 have been committed; additionally, the instructions with IID=85 to 120 have been fetched. Now, the IIDs from 53 to 70 and from 85 to 120 are in use, while the IIDs from 71 to 84 are blocked.

This means that the range of occupied IIDs (including the blocked IIDs) is always a continuous range, which may wrap around and which crawls along the range of legal IIDs like a little worm. It may stretch somewhat or it may contract. The head of that IID range is always defined by the next IID to be assigned, while the tail is defined by the IID of the instruction that is to be committed next.

Is it possible that the head of the IID-worm starts overtaking its own tails This could indeed happen, for example there might be an instruction which needs very long before it can be committed, and there might be a sufficient number of purges, such that vast ranges of IIDs are blocked. In this case, it must be prohibited that the tail IID is assigned again at the head, because this would violate the uniqueness of IID+offset. Two instructions in the window buffers with identical IIDs would exist, and thus, an incorrect write-back of results would occur. Therefore, the entity assigning IIDs has to check the tail (the internal instruction to be committed next) and has to stop issuing instructions as soon as an IID that is still in use would have to be assigned again.

But besides the problem of non-unique IIDs caused by the head overtaking the tail there still remains a problem with writing back results of instructions that have already been purged: In case an instruction initiates an activity and is purged afterwards, it must be guaranteed that when the activity's results are to be written back to the window buffers, the IID has not yet been assigned again. Otherwise a recently issued instruction would receive the result data of an old instruction belonging to a mispredicted branch.

Much of the problem is caused by the situation when the head of the worm comes close to its own tail, because in this case, the time between starting an activity, purging the associated instruction and assigning the IID again is relatively short (only a few cycles).

If that gap could be widened, and therefore the number of cycles before any given IID can be assigned again is greater, only a few activities would remain which take a very long time. These few activities must be handled separately.

In FIG. 6, it is shown how the range of IIDs can be partitioned into four quadrants (Q00, Q01, Q10 and Q11), which are defined by the two high-order bits of the IIDs. For example, Q00 is the quadrant with high-order bits "00".

Whenever the head of the worm is about to enter a new quadrant, it checks whether the tail is in the previous quadrant. If it is not, issuing is stopped until the tail has entered this quadrant. For example, let's assume that IID 192 is about to be assigned. If the IID of the instruction to be committed next is not in the range 128–191, issuing is stopped, and not resumed until the committer has moved into this range.

This mechanism assures that at most half of the IIDs are occupied at any given point in time (two complete quadrants, but not a third one). This also means that after an instruction has been purged, the worm must crawl through half of the range before the associated IID can be assigned again. In the example, 128 IIDs must at least be assigned before a purged IID is assigned again. Since at most four IIDs can be assigned per cycle, it takes at least 32 cycles (actually some more cycles) until the purged IID is assigned again.

There are only a few activities that take more than 32 cycles for completion (such activities might be related to address translation and to level 1 cache access). For these potentially long running processes a mechanism is needed to cancel a running action or at least to block the writing back of results after the action is completed. In addition, there must be an indication to these long running processes that the instruction which had originally started the activity has been purged. The mechanism described above ensures, that when a new quadrant is entered, the tail of the worm is in the previous quadrant. Therefore, when quadrant Q01 is entered, all IIDs with high-order bit "1" are not in use. Similarly when Q11 is entered, all IIDs with high order bit "0" are not in use. The process generating IIDs can broadcast the event of entering Q01 and Q11 to all long running units. These units would simply have to check if the IID of the current activity has high-order bit "1" or "0" respectively. If the high-order bit matches, the process must not write back a result.

There remains another problem. In case a conditional branch has been mispredicted, all instructions following said branch have to be purged. The IID of the purge-point is known. It now has to be determined whether some IID belonging to another instruction is earlier in the external sequence than said purge-point or not. In case it is not, it has to be purged.

FIG. 7 shows how IIDs can be easily checked for their relative position in the external instruction sequence. It is not necessary to know more than two currently active IIDs to decide which one is earlier. No knowledge of the current range of active IIDs is required.

In the first step (700) of the comparison, the two high-order bits of the IIDs are compared. In case the two high-order bits of IID 1 are different from the two high-order bits of IID 2, the relative position of IID 1 and IID 2 can be determined by means of table 701. In case they are equal, the usual logical comparison of the low order bits (all bits except for the two high order bits) of the IIDs decides which IID is earlier in the external sequence (702). Thus, the internal instructions to be purged can easily be distinguished from those not to be purged.

We claim:

1. A method for addressing internal instructions in an out-of-order processor, said out-of-order processor comprising at least two window buffers holding said internal instructions, each of said internal instructions belonging to a group of internal instructions representing an external instruction, said internal instructions of said group of internal instructions being distributed among different window buffers, at least one functional unit, to which said internal instruction from said window buffers are issued, characterized by a step of assigning one common instruction identifier to each of said internal instructions of said group of internal instructions representing an external instruction.

2. A method for addressing internal instructions according to claim 1, further characterized by a step of assigning an offset identifier to each of said internal instructions of said group of internal instructions representing an external instruction, said offset identifier, together with said instruction identifier, unambiguously identifying each of said internal instructions.

3. A method for addressing internal instructions according to claim 1, characterized in that said external instructions are instructions of the RISC-type.

4. A method for addressing internal instructions according to claim 1, characterized in that said external instructions are instructions of the CISC-type.

5. A method for addressing internal instructions according to claim 1, characterized in that said internal instructions are instructions of the RISC-type.

6. A method for addressing internal instructions according to claim 1, characterized in that at least one of said window buffers being an instruction window buffer (IWB) holding register operations.

7. A method for addressing internal instructions according to claim 1, characterized in that at least one of said window buffers being a storage window buffer (SWB) holding storage operations.

8. A method for addressing internal instructions according to claim 2, further characterized by a step of transmitting said instruction identifier and said offset identifier of an internal instruction, together with result data, via result busses from said functional units to said window buffers.

9. A method for addressing internal instructions according to claim 8, further characterized by a step of comparing said instruction identifier and said offset identifier transmitted via said result busses to instruction identifiers and offset identifiers of internal instructions' source operands contained in said window buffers, and, in case a match occurs, copying said result data transmitted via said result busses to the source operand where said match has occurred.

10. A method for addressing internal instructions according to claim 1, further characterized in that assigning of instruction identifiers to internal instructions is stopped as soon as more than a predefined fraction of the range of possible instruction identifiers has been assigned to internal instructions.

11. An out-of-order processor comprising at least two window buffers holding internal instructions, each of said internal instructions belonging to a group of internal instructions representing an external instruction, said internal instructions of said group of internal instructions being distributed among different window buffers, at least one functional unit, to which said internal instructions from said window buffers are issued, characterized by means for assigning one common instruction identifier to each of said internal instructions of said group of internal instructions representing an external instruction.

12. An out-of-order processor according to claim 11, further characterized by means for assigning an offset identifier to each of said internal instructions of said group of internal instructions representing an external instruction, said offset identifier, together with said instruction identifier, unambiguously identifying each of said internal instruction.

13. An out-order-processor according to claim 11, further characterized in that said external instructions are instructions of the RISC-type.

14. An out-of-order processor according to claim 11, further characterized in that, said external instructions are instructions of the CISC-type.

15. An out-of-order processor according claim 11, further characterized in that, said internal instructions are instructions of the RISC-type.

16. An out-of-order processor according to claim 11, further characterized in that, at least one of said window buffers being an instruction window buffer (IWB) holding register operation.

17. An out-of-order processor according to claim 11, further characterized in that at least one of said window buffers being a storage window buffer (SWB) holding storage operation.

18. An out-of-order processor according to claim 12, further characterized by result bus means, transmitting said instruction identifiers and said offset identifiers of an internal instruction together with result data from said functional units to said window buffers.

19. An out-of-order processor according to claim 18, further characterized by compare means, comparing said instruction identifier and said offset identifier transmitted by said result bus means to instruction identifiers and offset identifiers' source operands contained in said window buffers, and, in case a match occurs, copying said result data transmitted by said result bus means to the source operand where said match has occurred.

20. An out-of-order processor according claim 11, further characterized by means for stopping assignment of instruction identifiers to internal instructions as soon as more than a predefined fraction of the range of possible instruction identifiers has been assigned to internal instructions.

\* \* \* \* \*